(12) United States Patent
Hiji (10) Patent No.: US 7,263,572 B2
(45) Date of Patent: Aug. 28, 2007

(54) BUS BRIDGE AND DATA TRANSFER METHOD

(75) Inventor: Yoshihiro Hiji, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 195 days.

(21) Appl. No.: 11/064,084

(22) Filed: Feb. 24, 2005

(65) Prior Publication Data

US 2006/0080489 A1    Apr. 13, 2006

(30) Foreign Application Priority Data

Oct. 12, 2004    (JP)    ............................. 2004-298166

(51) Int. Cl.
*G06F 13/36*    (2006.01)
(52) U.S. Cl. ..................... 710/308; 710/60; 710/310
(58) Field of Classification Search .................. 710/55, 710/310, 60, 308
See application file for complete search history.

(56) References Cited

U.S. PATENT DOCUMENTS 5,761,450 A * 6/1998 Shah .......................... 710/107
5,764,966 A * 6/1998 Mote, Jr. ..................... 713/400

FOREIGN PATENT DOCUMENTS

| JP | 10-4420 | 1/1998 |
|---|---|---|
| JP | 11-110342 | 4/1999 |
| JP | 2001-109706 | 4/2001 |

* cited by examiner

*Primary Examiner*—Paul R. Myers
(74) *Attorney, Agent, or Firm*—Staas & Halsey LLP (57) ABSTRACT

In response to a direct memory access (DMA) request, a direct memory access controller (DMAC) performs reading at a host side at which a high-speed bus master is arranged. A bus bridge sends a dummy data to the DMAC, and performs reading at an input/output (I/O) side at which a low-speed slave device is arranged. In response to a following DMA request, the DMAC performs reading at the host side. The bus bridge sends a data read for a previous DMA request at the I/O side to the DMAC, and performs reading at the I/O side. Data that is read in response to a final DMA request at the I/O side is stored in a buffer inside the bus bridge. A central processing unit (CPU) reads a last read data from the buffer.

8 Claims, 7 Drawing Sheets

BUS BRIDGE AND DATA TRANSFER METHOD

CROSS-REFERENCE TO RELATED APPLICATIONS

This application is based upon and claims the benefit of priority from the prior Japanese Patent Application No. 2004-298166, filed on Oct. 12, 2004, the entire contents of which are incorporated herein by reference.

BACKGROUND OF THE INVENTION

1) Field of the Invention

The present invention relates to a bus bridge and a data transfer method.

2) Description of the Related Art

Recently, an operation frequency of a central processing unit (CPU) on a bus line has been improved, and a data transfer speed between high-speed input/output (I/O) devices has also been improved. However, to ensure compatibility with older computer systems or for other purposes, it is necessary to connect a conventional low-speed I/O device to a computer system that includes a high-speed bus line.

Conventionally, a master device that is connected to a high-speed bus is connected to a bus bridge to access to a low-speed device. Through the bus bridge, the master device accesses to a low-speed device that is connected to a low-speed bus. Such a technology is disclosed in, for example, Japanese Patent Laid-Open Publication No. H10-4420. Moreover, in a conventional technology, a structure that includes a bus bridge to connect a Peripheral Component Interconnect (PCI) bus, which is a high-speed bus, and a low-speed bus is applied. The PCI bus is connected to a high-speed device and the low-speed bus is connected to a low-speed device, and the bus bridge is arranged therebetween. Such technology is disclosed in, for example, Japanese Patent Laid-Open Publication No. H11-110342. Furthermore, a technology that includes a structure in which a direct memory access (DMA) controller is arranged is disclosed in, for example, Japanese Patent Laid-Open Publication No. 2001-109706. The structure includes a bus bridge, the DMA controller, a CPU (microprocessor), a high-speed I/O device, a low-speed I/O device, a high-speed bus, and a low-speed bus.

Figure 7:
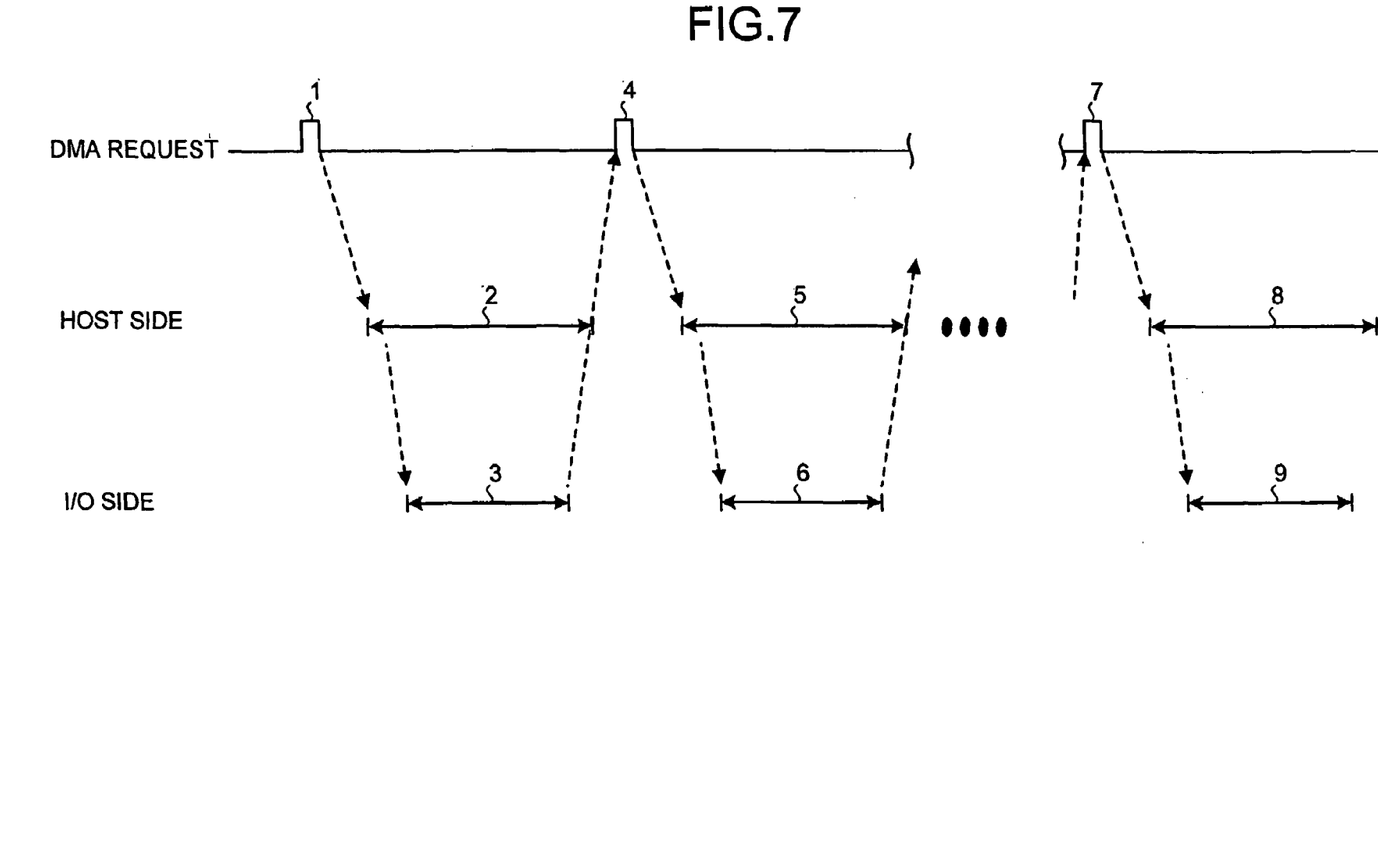
FIG. 7 is a timing chart for explaining a conventional read access method.

FIG. 7 is a timing chart of a conventional method to perform a read access to an I/O device on a low-speed bus line (hereinafter, a low-speed slave device) in a conventional system in which a computer system includes a high-speed bus line, and is connected a low-speed I/O device. In the conventional system, a bus master is arranged on a high-speed bus line (hereinafter, a high-speed bus master), and the bus master accesses to the low-speed slave device. In a following description, a side of the high-speed bus master is referred to as a host side, while a side of the low-speed slave device is referred to as an I/O side.

As shown in FIG. 7, the low-speed slave device generates a DMA request 1 toward a DMA controller (DMAC). Upon receiving the DMA request, the DMAC performs the read bus cycle 1 at the host side, which is shown with a reference numeral 2 in FIG. 7. A bus bridge performs the read bus cycle at the I/O side, which is shown with a reference numeral 3 in FIG. 7. When reading at the I/O side is completed, and the bus bridge sends a read data to the DMAC, the low-speed slave device generates a new DMA request 4 toward the DMAC.

The DMAC performs the read bus cycle 4 at the host side, which is shown with reference numeral 5 in FIG. 7. Also, the bus bridge performs the read bus cycle 4 at the I/O side, which is shown with a reference numeral 6 in FIG. 7. Then, the bus bridge sends a read data to the DMAC. Such a process is repeated to transfer a data. When the low-speed slave device generates a final DMA request 7, the DMAC and the bus bridge performs the final read bus cycle at the host side and the I/O side respectively, which are shown with reference numerals 8 and 9. When a final read data is sent from the bus bridge to the DMAC, the transfer of the data is finished.

However, if a low-speed I/O device is connected to a high-speed bus line, a large number of wait cycles are inserted when the low-speed I/O device is accessed. This may deteriorate the performance of the system. Moreover, if the high-speed I/O device and the low-speed I/O device are arranged on a same bus line, even a high-speed operation of the high-speed I/O device is inhibited because of the wait cycles that are inserted when the low-speed I/O device is accessed on the same bus line.

SUMMARY OF THE INVENTION

It is an object of the present invention to solve at least the above problems in the conventional technology.

A bus bridge according to one aspect of the present invention is connected between a high-speed bus line and a low-speed bus line. A high-speed device is connected to the high-speed bus line and a low-speed device is connected to the low-speed bus line. The bus bridge includes a buffer unit that temporarily stores data that is read from the low-speed device via the low-speed bus line; a register that stores a value of a valid flag that indicates that valid data is stored in the buffer unit; and a control logic unit that performs a control to output the data from the buffer unit to the high-speed device. The control includes releasing the high-speed bus line before completion of reading of the data from the low-speed device, writing the data read in the buffer unit, setting a value in the register to indicate that valid data is stored in the buffer unit, confirming, at a following access in a series of accesses to the high-speed device, that a value stored in the register indicates that valid data is stored in the buffer unit, and outputting the data from the buffer unit to the high-speed device.

A data transfer method for successively transferring data from a low-speed device to a high-speed device via a bus bridge according to another aspect of the present invention is connected between a high-speed bus line and a low-speed bus line. The low-speed device is connected to the low-speed bus line, and the high-speed device is connected to the high-speed bus line. The data transfer method includes releasing the high-speed bus line before completion of reading of data from the low-speed device; writing the data read in the bus bridge; temporarily storing the data in the bus bridge; and outputting the data from the bus bridge to the high-speed device at a following access in a series of accesses to the high-speed device.

The other objects, features, and advantages of the present invention are specifically set forth in or will become apparent from the following detailed description of the invention when read in conjunction with the accompanying drawings.

DETAILED DESCRIPTION

Exemplary embodiments of a bus bridge and a data transfer method according to the present invention will be explained below in detail with reference to the accompanying drawings.

Figure 1:
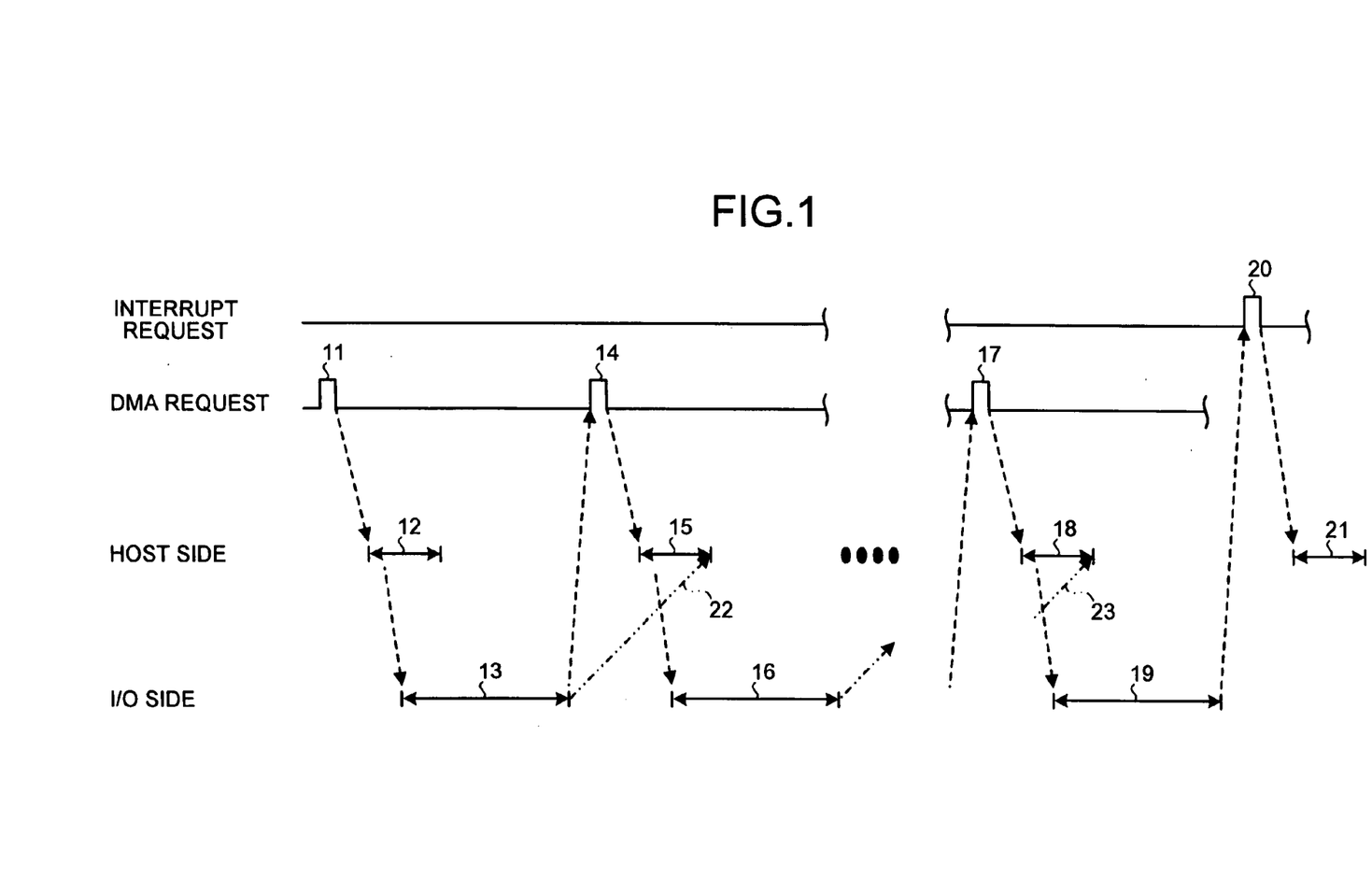
FIG. 1 is a timing chart for explaining a read access method according to an embodiment of the present invention.
Figure 2:
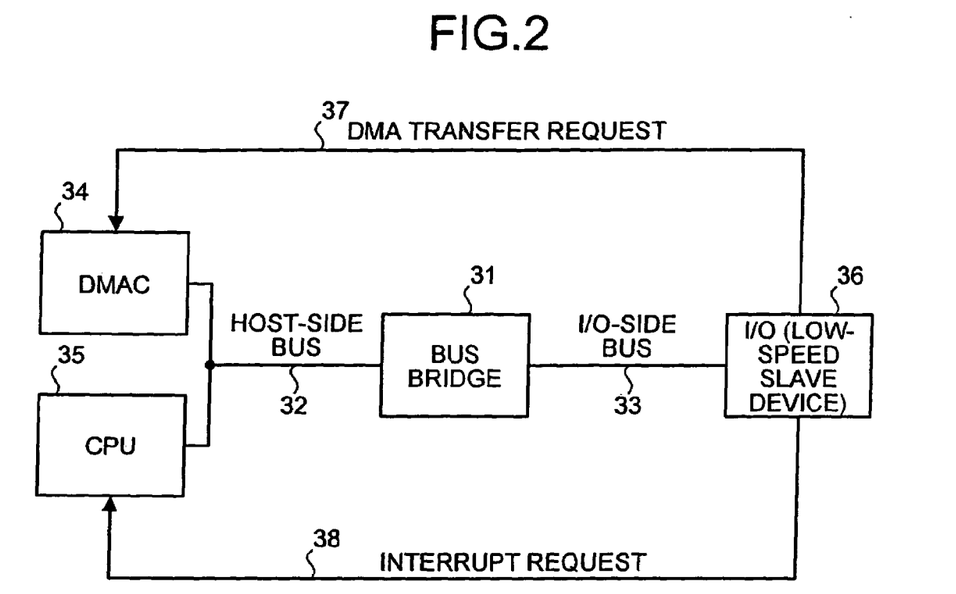
FIG. 2 is a block diagram of a system to which a bus bridge according to the embodiment is applied.

FIG. 2 is a block diagram of a system to which a bus bridge according to an embodiment of the present invention is applied. As shown in FIG. 2, a bus bridge 31 includes a high-speed host-side bus 32 having connected thereto a DMAC 34 and a CPU 35 that together serve as a high-speed bus master. The bus bridge 31 also includes a low-speed I/O-side bus 33 having connected thereto a low-speed slave device 36. The low-speed slave device 36 produces and sends DMA requests (DMA transfer requests) to the DMAC 34. Also, the low-speed slave device 36 produces and sends interrupt requests 38 to the CPU 35.

Figure 3:
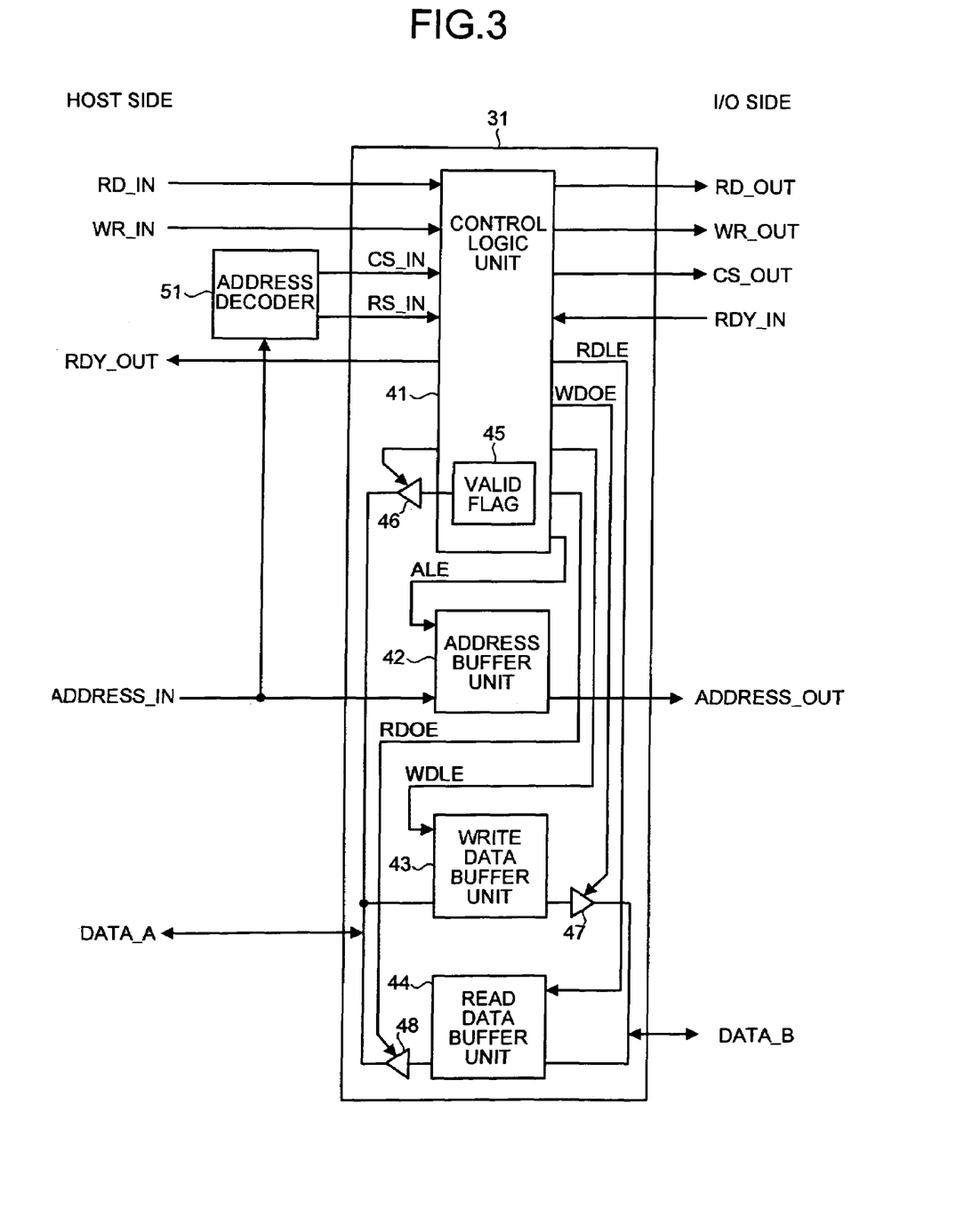
FIG. 3 is a block diagram of a bus bridge according to the embodiment.

FIG. 3 is a block diagram of the bus bridge 31. In FIG. 3, the DMAC 34 and the CPU 35 are connected to the host side (at left in the drawing), while the low-speed slave device 36 is connected to the I/O side (at right in the drawing). As shown in FIG. 3, the bus bridge 31 includes a control logic unit 41, an address buffer unit 42, a write data buffer unit 43, and a read data buffer unit 44.

The control logic unit 41 is a logic circuit that controls the operation of the bus bridge 31, and incorporates a valid flag 45. The valid flag 45 is a register for storing a value indicating that valid data is retained in the read data buffer unit 44. The value of the valid flag 45 is read by the host side in association with an RS_IN signal, which will be described further below, and is then output to the host-side data bus (Data_A) via a buffer 46, and is then read by the CPU. At this time, the buffer 46 is controlled based on a control signal output as an internal signal from the control logic unit 41.

The address buffer unit 42 is a buffer register for retaining an address, to be accessed by the host side to the I/O side, while a bus cycle continues at the I/O side. The write data buffer unit 43 is a buffer register for retaining data to be written from the host side to the low-speed slave device 36 while the bus cycle continues at the I/O side. The read data buffer unit 44 is a buffer register that temporarily retains data read from the I/O side.

The control logic unit 41 receives inputs of an RD_IN signal and a WR_IN signal from the host side. The RD_IN signal is a signal indicating that data reading is being performed in a bus cycle at the host side. The WR_IN signal is a signal indicating that data writing is being performed in a bus cycle at the host side. The control logic unit 41 also receives inputs of a CS_IN signal and the RS_IN signal generated at an address decoder 51. The CS_IN signal is a signal indicating that the I/O side is being accessed in the bus cycle at the host side.

The RS_IN signal is a selection signal for use in accessing the read data buffer unit 44 from the host side. In the present embodiment, which is not particularly restrictive, the address decoder 51 is provided at the host side to receive an input of an address of the host side from a host-side address bus (Address_In). The control logic unit 41 outputs an RDY_OUT signal to the host side. The RDY_OUT signal is a signal that notifies the high-speed bus master at the host side of the completion of the bus cycle at the host side.

Also, the control logic unit 41 outputs an RD_OUT signal, a WR_OUT signal, and a CS_OUT signal to the I/O side. The RD_OUT signal is a signal indicating that data reading is being performed in the bus cycle being executed by the bus bridge 31 at the I/O side. The WR_OUT signal is a signal indicating that data writing is being performed in the bus cycle being executed by the bus bridge 31 at the I/O side. The CS_OUT signal is a signal indicating that the bus bridge 31 is executing a bus cycle at the I/O side. The control logic unit 41 also receives an input of an RDY_IN signal from the I/O side. The RDY_IN signal is a signal that notifies the bus bridge 31 of the completion of the bus cycle at the I/O side, and is output from the low-speed slave device 36.

Furthermore, the control logic unit 41 outputs an RDLE signal, a WDOE signal, a WDLE signal, an RDOE signal, and an ALE signal as internal signals of the bus bridge 31. The RDLE signal is a signal for instructing the read data buffer unit 44 to capture data from an I/O-side data bus (Data_B). The WDOE signal is a signal for instructing the outputting of data from the write data buffer unit 43 to the I/O-side data bus (Data_B) via a buffer 47. The WDLE signal is a signal for instructing the write data buffer unit 43 to capture data from the host-side data bus (Data_A).

The RDOE signal is a signal for instructing the outputting of data from the read data buffer unit 44 to the host-side data bus (Data_A) via a buffer 48. The ALE signal is a signal for instructing the capturing of an address at the host side from the host-side address bus (Address_In) to the address buffer unit 42. The contents of the address buffer unit 42 are output to an I/O-side address bus (Address_Out).

The bus bridge 31 that has the structure described above performs a following operation on a combination of input signals from the host side. When the CS_IN signal and the RS_IN signal are both at a relatively low potential level (such a level is hereinafter denoted as "L"), or when the RD_IN signal and the WR_IN signal are both at "L", the operation of the bus bridge 31 enters a "no operation" state. When the CS_IN signal and the RS_IN signal are both at a relatively high potential level (such a level is hereinafter denoted as "H"), or when the RD_IN signal and the WR_IN signal are both at "H", the operation of the bus bridge 31 prohibits any input.

When the CS_IN signal, the RS_IN signal, the RD_IN signal, and the WR_IN signal are at "L", "H", "H", and "L", respectively, a read access is performed on the register in the bus bridge 31 according to the value of the least significant bit of the address on the host-side address bus (Address_In). If the value of the least significant bit of the address is "0", the value of the valid flag 45 is to be read. If the value of the least significant bit is "1", data in the read data buffer unit 44 is to be read. When the CS_IN signal, the RS_IN signal, the RD_IN signal, and the WR_IN signal are at "L", "H", "L", and "H", respectively, a write access is performed on a register in the bus bridge 31. In the example shown in the drawing, no writable register is present in the bus bridge 31, and therefore the operation of the bus bridge 31 enters a "no operation" state.

When the CS_IN signal, the RS_IN signal, the RD_IN signal, and the WR_IN signal are at "H", "L", "H", and "L", respectively, the bus bridge 31 starts a read access to the I/O side. The bus bridge 31 then returns the data of the read data buffer unit 44, without waiting for the completion of the access to the I/O side, to complete the operation of the host side. When the CS_IN signal, the RS_IN signal, the RD_IN signal, and the WR_IN signal are at "H", "L", "L", and "H", respectively, the bus bridge 31 starts a write access to the I/O side. Next, the bus bridge 31 captures data into the write data buffer unit 43, and then completes the operation of the host side without waiting for the completion of the operation at the I/O side.

Figure 4:
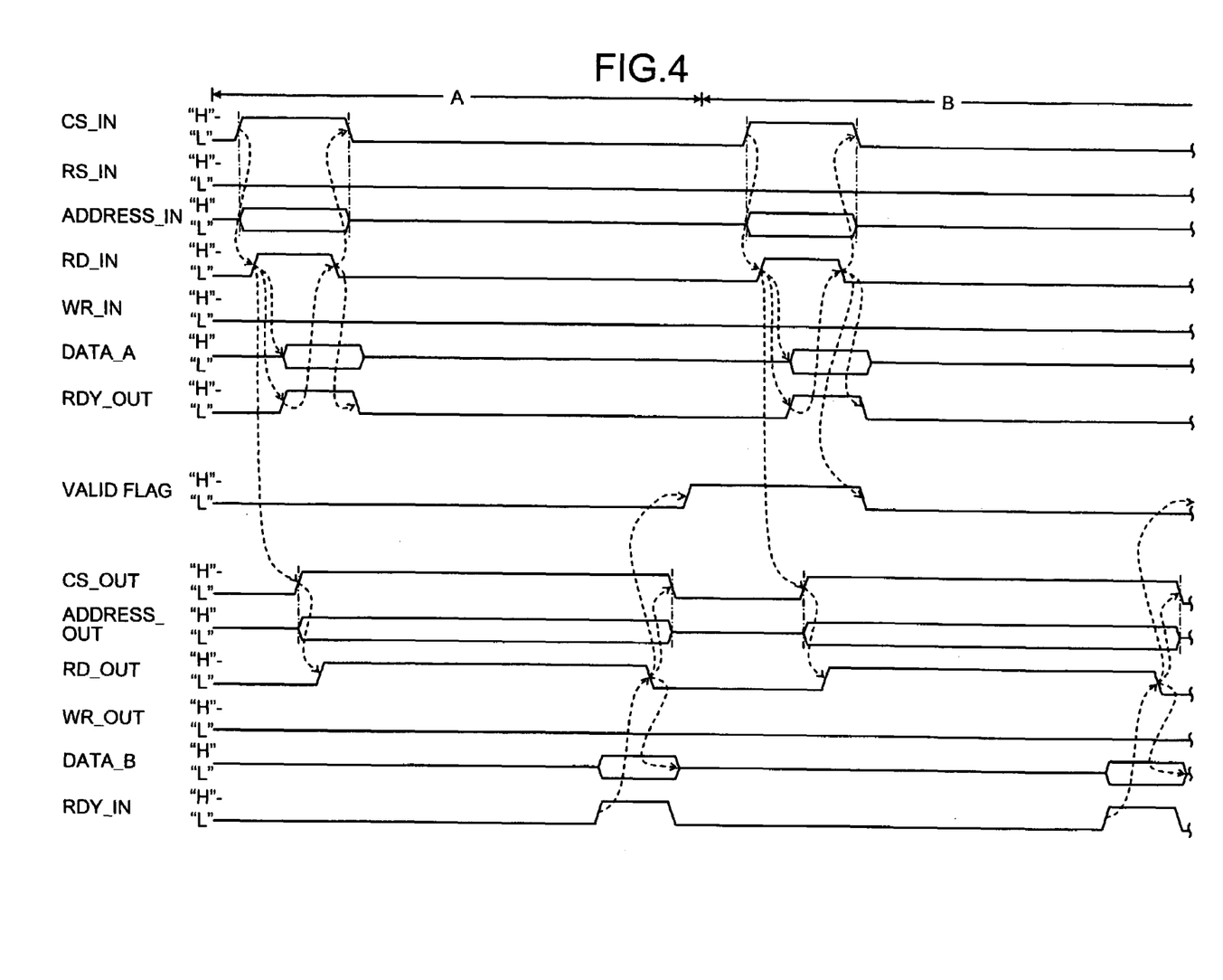
FIG. 4 is a timing chart for explaining a read access method according to the embodiment.

FIG. 4 is a timing chart for explaining an operation when a read access is performed at the I/O side in response to the read access from the host side. As shown in FIG. 4, an initial DMA request is produced. With this, either one of the CPU and the DMAC (hereinafter collectively referred to as a host-side bus master) for controlling transfer at the host-side bus asserts the CS_IN signal (in the example shown in the drawing, drives the signal to "H") and simultaneously outputs an address to the host-side address bus (Address_In) for starting an access. Slightly after the start of the access, the host-side bus master asserts the RD_IN signal to indicate that the access performed by the host-side bus is to read data.

Upon assertion of the RD_IN signal, the bus bridge 31 outputs the contents of the read data buffer unit 44 to the host-side data bus (Data_A) and simultaneously asserts the RDY_OUT signal to notify the host-side bus master of the completion of the host-side bus cycle. At this time, the valid flag 45 is negated, and no valid data is present in the read data buffer unit 44. Therefore, invalid data, that is, dummy data, is output to the host-side data bus (Data_A). Then, the host-side bus master negates the RD_IN signal (in the example shown in the drawing, drives the signal to "L"), the bus bridge 31 negates the RDY_OUT signal, and the host-side bus master negates the CS_IN signal.

On the other hand, upon detection of the start of the read access at the host-side bus based on the assertion of the RD_IN signal, the bus bridge 31 relays the access to the I/O side, and asserts the CS_OUT signal. Simultaneously, the bus bridge 31 outputs the contents of the address buffer unit 42 to the I/O-side address bus (Address-Out). Also, upon assertion of the CS_OUT signal, the bus bridge 31 asserts the RD_OUT signal.

In this state, upon detection of the assertion of the RDY_IN signal, the bus bridge 31 captures data on the I/O data bus (Data B) into the read data buffer unit 44. The bus bridge 31 then negates the RD_OUT signal, the CS_OUT signal, the CS_OUT signal, and the RDY_IN signal to complete the read bus cycle at the I/O side. At this time, valid data is present in the read data buffer unit 44, and therefore the valid flag 45 is asserted. A period up until the end of this process is referred to as a period A.

When a second DMA request is produced, the host-side bus master asserts again the CS_IN signal and simultaneously outputs an address to the host-side address bus (Address_In) for starting an access. Thereafter, the procedure until the contents of the read data buffer unit 44 are output to the host-side data bus (Data_A) to complete the host-side bus cycle is the same as the procedure for the period A described above. However, in the present access, the valid flag 45 is asserted to indicate that valid data is present in the read data buffer unit 44. Therefore, the bus bridge 31 outputs the data of the read data buffer unit 44 to the host-side data bus (Data_A), and then negates the valid flag 45 after completion of the access.

Thereafter, as described above, in the read bus cycle at the I/O side, the data on the I/O-side data bus (Data_B) is captured into the read data buffer unit 44. Therefore, the valid flag 45 is again asserted. A period starting from after the period A until this assertion is referred to as a period B. Thereafter, when the CS_IN signal is again asserted due to the occurrence of a DMA request, the operation during the period B is repeated. In the state where the I/O side is being continuously accessed, data is always sent to the host side with a delay of one cycle. Therefore, after the host-side bus master has completed DMA transfer for a programmed number of times, the data read from the I/O side remains in the read data buffer unit 44. This remaining data is drawn to the host side by an operation shown in FIG. 5.

Figure 5:
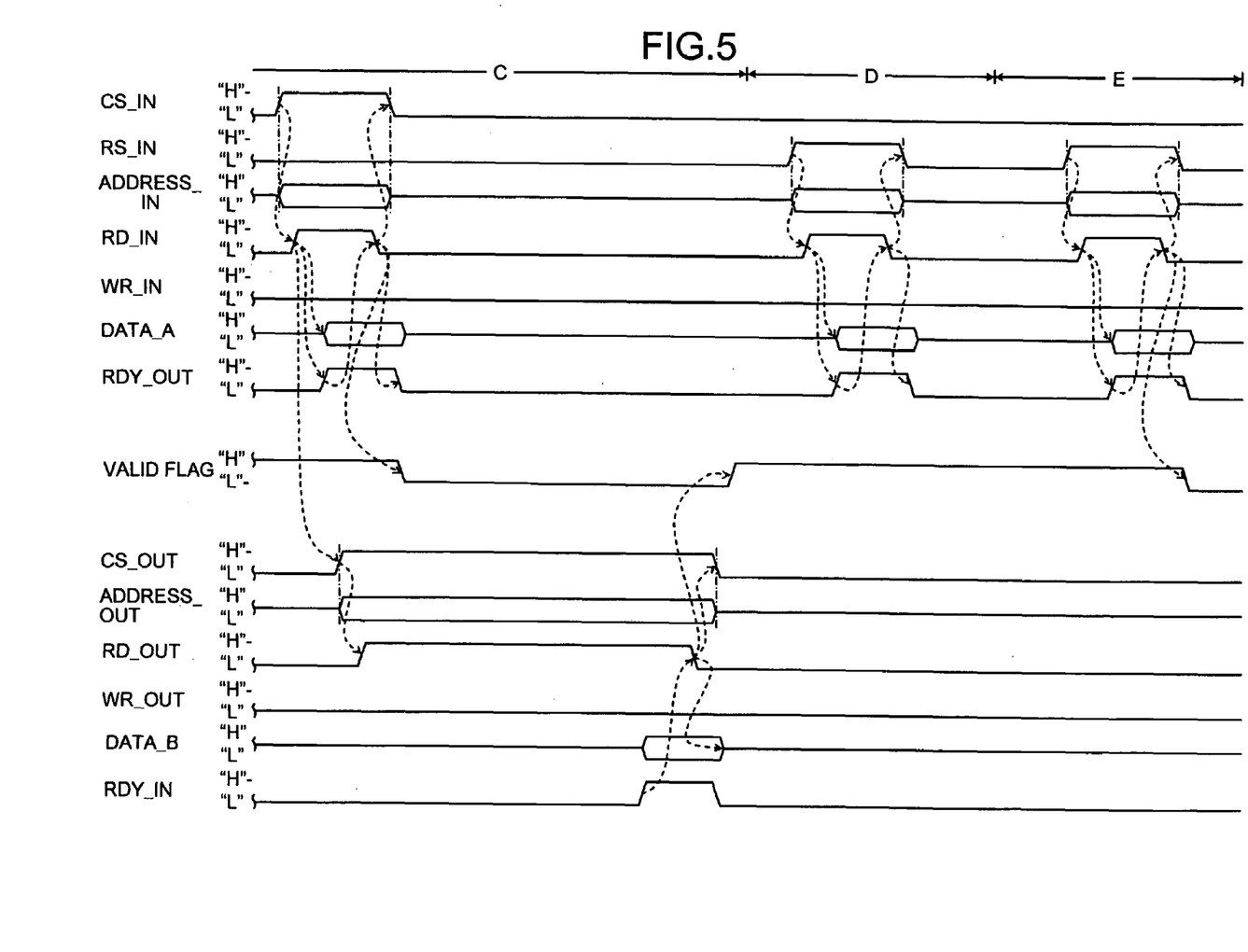
FIG. 5 is another timing chart for explaining the read access method.

FIG. 5 is a timing chart for explaining the operation to draw the data remaining in the read data buffer unit 44 to the host side after completion of the DMA transfer, the timing chart of FIG. 5 following the timing chart shown in FIG. 4. As shown in FIG. 5, the host-side bus master asserts the CS_IN signal and outputs an address for starting an access. Thereafter, until valid data is stored in the read data buffer unit 44 in the last read bus cycle at the I/O side to assert the valid flag 45 (during a period C in the drawing), the operation is the same as that shown in FIG. 4 during the period B.

Upon completion of the last read bus cycle at the I/O side, an interrupt request is produced. With this, to check that valid data is present in the read data buffer unit 44, the host-side bus master asserts the RS_IN signal and simultaneously outputs an address to the host-side address bus (Address_In) for starting a read access to the valid flag 45. Slightly after the start of the access, the host-side bus master asserts the RD_IN signal to indicate that the access performed at the host-side bus is to read data.

Upon assertion of the RD_IN signal, the bus bridge 31 outputs the value of the valid flag 45 to the host-side data bus (Data_A) and simultaneously asserts the RDY_OUT signal to notify the host-side bus master of the completion of the host-side bus cycle. After the host-side bus master negates the RD_IN signal, the bus bridge 31 negates the RDY_OUT signal. Also, after negating the RD_IN signal, the host-side bus master negates the RS_IN signal. Unlike the case of an access to the I/O side, when the register in the bus bridge 31 is accessed, no access occurs at the I/O side. A period after the period C until the negation of the RS_IN signal is referred to as a period D.

When the valid flag 45 is negated, valid data has not yet been present in the read data buffer unit 44. Therefore, the value of the valid flag 45 is again checked. Then, the operation of the period D is repeated until the value of the valid flag 45 is asserted. When the valid flag 45 is asserted and valid data is present in the read data buffer unit 44, the host-side bus master asserts the RS_IN signal and simultaneously outputs an address to the host-side address bus (Address_In) for starting a read access to the read data buffer unit 44.

Slightly after the start of the access to the read data buffer unit 44, the host-side bus master asserts the RD_IN signal to indicate the access performed at the host-side bus is to read data. Upon assertion of the RD_IN signal, the bus bridge 31 outputs the data of the read data buffer unit 44 to the host-side data bus (Data_A) and simultaneously asserts the RDY_OUT signal to notify the host-side bus master of the completion of the host-side bus cycle.

After the host-side bus master negates the RD_IN signal, the bus bridge 31 negates the RDY_OUT signal. Also, after negating the RD_IN signal, the host-side bus master negates the RS_IN signal. Since an access during a period E immediately after the period D is also to access the register in the bus bridge 31, no access to the I/O side occurs. Finally, since the valid data present in the read data buffer unit 44 has been output to the host-side data bus (Data_A), the bus bridge 31 negates the valid flag 45 after completion of the access.

Figure 6:
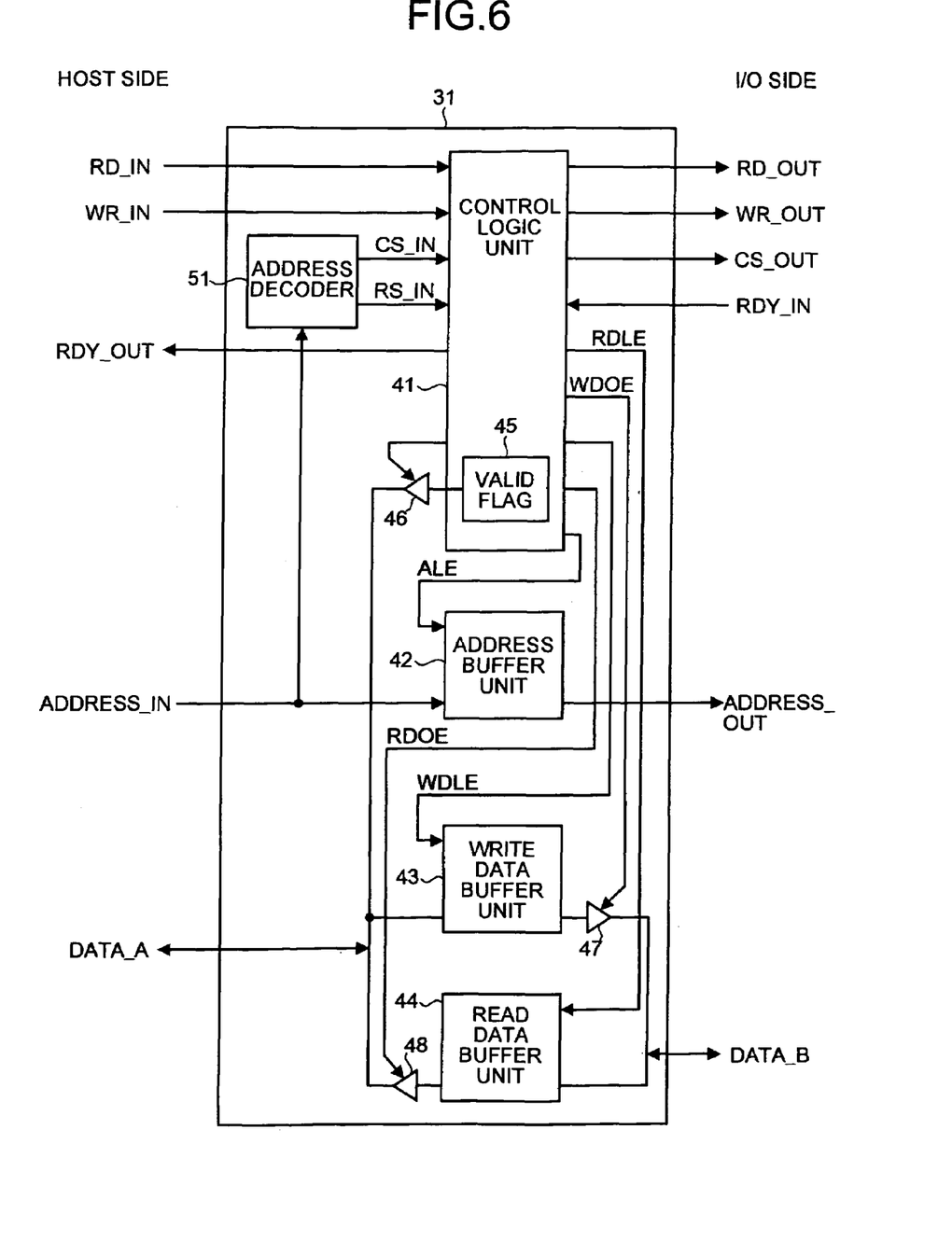
FIG. 6 is a block diagram of a bus bridge according to an embodiment of the present invention.

Here, instead of reading the register of the valid flag 45 in the bus bridge 31 from the host side to check the value of the valid flag 45 based on the value of the register, the value of the valid flag 45 may be lead as a signal line to the outside of the bus bridge 31, thereby allowing the value of the valid flag 45 to be checked. In this case, a CPU including a general-purpose I/O port is used for control, and the signal line for the bus bridge 31 to output the value of the valid flag 45 is connected to the general-purpose I/O port. With this, by reading the general-purpose I/O port having connected thereto the signal line, the value of the valid flag 45 can be checked. Also, as shown in FIG. 6, the bus bridge 31 may include the address decoder 51.

As described above, according to the present embodiment, a waiting state of the high-speed host-side bus 32 can be reduced, thereby causing the host-side bus 32 to be released quickly. Therefore, an effect can be achieved such that a read access to the low-speed I/O-side bus 33 can be performed without occupying the high-speed host-side bus 32 for a long time. Also, the bus bridge 31 can be used with bus standards without bus protocols, such as "disconnect" or "retry", and therefore can be applied as an interface between the low-speed slave device 36 having a low-speed, old-style bus and the high-speed CPU 35.

Particularly, as for DMA transfer, information indicating that data to be transferred is ready is reported from the I/O side as a DMA request. Therefore, polling to the valid flag only at one last time is enough. This can efficiently reduce a bus occupying time. The present invention described above is not restricted to the embodiment described above, but may be variously modified.

According to the present invention, it is possible to carry out a read access to a bus on a side of a low-speed I/O without occupying a bus on a side of a high-speed host for a long time.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A bus bridge that is connected between a high-speed bus line and a low-speed bus line, wherein a high-speed device is connected to the high-speed bus line and a low-speed device is connected to the low-speed bus line, comprising:
   a buffer unit that temporarily stores data that is read from the low-speed device via the low-speed bus line;
   a register that stores a value of a valid flag that indicates that valid data is stored in the buffer unit; and
   a control logic unit that performs a control to successively transfer the data from the low-speed device to the high-speed device a predetermined number times, wherein
   the control includes releasing the high-speed bus line before completion of reading of the data from the low-speed device, storing the data read from the low-speed device in the buffer unit, setting a value in the register to indicate that valid data is stored in the buffer unit, confirming, at a following access in a series of accesses to the high-speed device, that a value stored in the register indicates that valid data is stored in the buffer unit, outputting the data from the buffer unit to the high-speed device and outputting dummy data to the high-speed device at a first access in the series of accesses to the high-speed device.

2. The bus bridge according to claim 1, wherein:
   the control logic unit performs, after completion of the predetermined number of accesses to the high-speed device, a control to output last data from the buffer unit to the high-speed device, wherein the last data is data that is read from the low-speed device in a last access to the low-speed device.

3. The bus bridge according to claim 2, wherein:
   the control logic unit performs a control to output, based on an event that occurs when the final access to the low-speed device is completed, final data from the buffer unit to the high-speed device, wherein the final data is data that remains in the buffer unit when the final access to the low-speed device is completed.

4. The bus bridge according to claim 3, wherein:
   the control logic unit performs the control to output the final data after confirming that the value stored in the register indicates that valid data is stored in the buffer unit, and releasing the high-speed bus line.

5. A data transfer method for successively transferring data from a low-speed device to a high-speed device via a bus bridge that is connected between a high-speed bus line and a low-speed bus line predetermined number times, the low-speed device being connected to the low-speed bus line, the high-speed device being connected to the high-speed bus line, comprising:
   releasing the high-speed bus line before completion of reading of data from the low-speed device;
   temporarily storing the data read from the low-speed device in the bus bridge;
   outputting the data from the bus bridge to the high-speed device at a following access in a series of accesses to the high-speed device; and
   outputting dummy data to the high-speed device at a first access in the series of accesses to the high-speed device.

6. The data transfer method according to claim 5, further comprising, after completion of the predetermined number of accesses to the high-speed device, outputting last data from the buffer unit to the high-speed device, wherein the last data is data that is read from the low-speed device in a last access to the low-speed device.

7. The data transfer method according to claim 6, further comprising outputting, based on an event that occurs when the final access is completed, final data from the buffer unit to the high-speed device, wherein the final data is data that remains in the buffer unit when the final access to the low-speed device is completed.

8. The data transfer method according to claim 7, wherein the outputting the final data includes confirming;
   that valid data is stored in the bus bridge; releasing the high-speed bus line; and
   outputting the final data.

* * * * *

UNITED STATES PATENT AND TRADEMARK OFFICE
CERTIFICATE OF CORRECTION

| | |
|---|---|
| PATENT NO. | : 7,263,572 B2 |
| APPLICATION NO. | : 11/064084 |
| DATED | : August 28, 2007 |
| INVENTOR(S) | : Yoshihiro Hiji |

It is certified that error appears in the above-identified patent and that said Letters Patent is hereby corrected as shown below:

Column 8, Line 58, change the second line in claim 8 from:

"...The data transfer method according to claim 9, wherein the outputting the final data includes confirming;..."

to

--The data transfer method according to claim 9, wherein the outputting the final data includes:
    confirming that valid data is stored in the bus bridge;
    releasing the high-speed bus line; and
    outputting the final data.--

Signed and Sealed this

Twenty-fifth Day of March, 2008

JON W. DUDAS
*Director of the United States Patent and Trademark Office*